US011982205B1

(12) United States Patent
Jain et al.

(10) Patent No.: US 11,982,205 B1
(45) Date of Patent: May 14, 2024

(54) AIRFOIL HAVING A SPAR ASSEMBLY FOR A TURBINE ENGINE

(71) Applicant: GENERAL ELECTRIC COMPANY, Schenectady, NY (US)

(72) Inventors: Nitesh Jain, Bangalore (IN); Abhijeet Jayshingrao Yadav, Bangalore (IN); Balaraju Suresh, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/171,490

(22) Filed: Feb. 20, 2023

(30) Foreign Application Priority Data

Dec. 28, 2022 (IN) ............................ 202211076366

(51) Int. Cl.

| | |
|---|---|
| ***F01D 5/14*** | (2006.01) |
| ***F01D 5/28*** | (2006.01) |
| ***F01D 9/02*** | (2006.01) |
| ***F01D 9/04*** | (2006.01) |
| ***F01D 25/24*** | (2006.01) |

(52) U.S. Cl.
CPC ............ *F01D 5/147* (2013.01); *F01D 5/282* (2013.01); *F01D 9/02* (2013.01); *F01D 9/04* (2013.01); *F01D 9/041* (2013.01); *F01D 9/042* (2013.01); *F01D 25/243* (2013.01); *F01D 25/246* (2013.01); *F05D 2220/323* (2013.01); *F05D 2300/603* (2013.01)

(58) Field of Classification Search
CPC ........ F01D 9/041; F01D 5/282; F01D 25/005; F04D 29/388; B64C 11/26; F05D 2220/323; F05D 2240/12; F05D 2240/30
See application file for complete search history.

(56) References Cited

U.S. PATENT DOCUMENTS

| | | | | |
|---|---|---|---|---|
| 3,753,326 A | | 8/1973 | Kaufman, Sr. | |
| 3,942,231 A | | 3/1976 | Whitaker | |
| 4,470,862 A | * | 9/1984 | More | B29C 70/34 29/889.6 |
| 4,524,499 A | * | 6/1985 | Grimes | B64C 27/46 416/241 A |
| 4,892,462 A | * | 1/1990 | Barbier | B64C 27/473 416/241 A |
| 5,102,300 A | * | 4/1992 | Violette | B64C 11/04 416/131 |
| 5,222,297 A | * | 6/1993 | Graff | B29C 70/865 29/889.7 |
| 5,269,658 A | * | 12/1993 | Carlson | F04D 29/668 29/889.71 |

(Continued)

FOREIGN PATENT DOCUMENTS

| | | | | |
|---|---|---|---|---|
| CA | 2888777 A1 * | 5/2014 | | F01D 5/147 |
| EP | 2469028 B1 | 12/2016 | | |

(Continued)

*Primary Examiner* — Brian Christopher Delrue
(74) *Attorney, Agent, or Firm* — McGarry Bair PC

(57) ABSTRACT

An airfoil for a turbine engine having a spar assembly. The spar assembly including a composite spar, a metallic hub, and a composite body. The metallic hub can receive a portion of the composite spar at an interior surface to define an overlapping region. The composite body is located at the overlapping region.

20 Claims, 8 Drawing Sheets

(56) References Cited

U.S. PATENT DOCUMENTS

| | | | | |
|---|---|---|---|---|
| 5,720,597 | A | 2/1998 | Wang et al. | |
| 6,039,542 | A | 3/2000 | Schilling et al. | |
| 6,460,240 | B1 | 10/2002 | Kielies et al. | |
| 6,659,722 | B2 | 12/2003 | Sehgal et al. | |
| 9,429,024 | B2 | 8/2016 | Nagle et al. | |
| 10,227,127 | B2 | 3/2019 | Murta et al. | |
| 10,549,842 | B2 * | 2/2020 | Andrzejewski | B64C 11/26 |
| 10,563,522 | B2 | 2/2020 | Thomas et al. | |
| 10,648,340 | B2 | 5/2020 | Darrow, Jr. | |
| 11,131,314 | B2 | 9/2021 | Welch | |
| 11,401,834 | B2 | 8/2022 | James et al. | |
| 2014/0322025 | A1 | 10/2014 | Barnhart et al. | |
| 2017/0002661 | A1 | 1/2017 | Opderbecke et al. | |
| 2019/0242399 | A1 | 8/2019 | Kray et al. | |
| 2019/0308376 | A1 * | 10/2019 | Backhouse | B29C 70/30 |
| 2019/0315451 | A1 * | 10/2019 | Seminel | B29C 70/48 |
| 2020/0086970 | A1 | 3/2020 | Behzadpour et al. | |
| 2023/0036022 | A1 * | 2/2023 | Kray | F01D 5/147 |

FOREIGN PATENT DOCUMENTS

| | | | |
|---|---|---|---|
| EP | 2568116 | B1 | 3/2019 |
| FR | 3111658 | B1 | 12/2021 |
| WO | 2015002976 | A1 | 1/2015 |

* cited by examiner

AIRFOIL HAVING A SPAR ASSEMBLY FOR A TURBINE ENGINE

CROSS-REFERENCE TO RELATED APPLICATION

This application claims priority to Indian Patent Application No. 202211076366, filed Dec. 28, 2022, which is incorporated herein by reference its entirety.

TECHNICAL FIELD

The disclosure generally relates to an airfoil with a spar assembly for a turbine engine, more specifically, to an airfoil with a spar assembly having a hub and a composite spar.

BACKGROUND

Composite materials typically include fiber-reinforced polymers and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
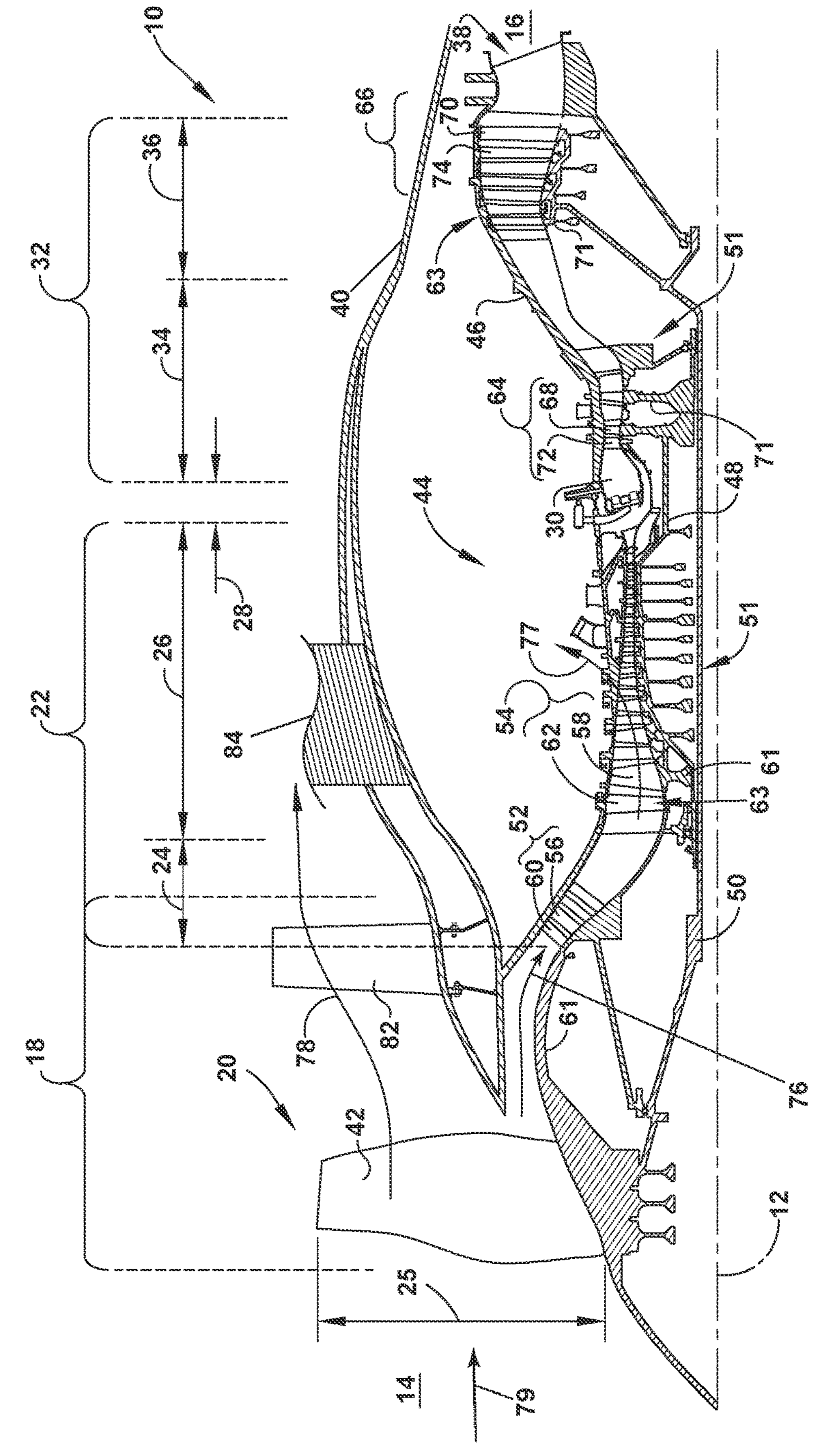
FIG. 1 is a schematic cross-sectional view of an unducted or open rotor turbine engine.

Traditionally, airfoils include a metal spar that is formed with or coupled to a metal hub or trunnion.

Aspects of the disclosure herein are directed to an airfoil for a turbine engine having a spar assembly. The spar assembly includes a composite spar, a metallic hub, and a composite body or composite wrap. The metallic hub can receive a portion of the composite spar at an interior surface to define an overlapping region. The composite body is located at the overlapping region and defines a structural joint between the composite spar and the metal hub.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The term "composite," as used herein is, is indicative of a material that does not include metal material. A composite can be a combination of at least two or more non-metallic elements or materials. Examples of a composite material can be, but not limited to, a polymer matrix composite (PMC), a ceramic matrix composite (CMC), carbon fiber, polymeric resin, thermoplastic, bismaleimide (BMI), polyimide materials, epoxy resin, glass fiber, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The terms "metallic" as used herein are indicative of a material that includes metal such as, but not limited to, titanium, iron, aluminum, stainless steel, and nickel alloys. A metallic material or alloy can be a combination of at least two or more elements or materials, where at least one is a metal.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" can be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" can be a gas or a liquid, or multi-phase.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

"Optional" or "optionally" means that the subsequently described event or circumstance may or may not occur, and that the description includes instances where the event occurs and instances where it does not.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain exemplary embodiments of the present disclosure, an unducted or open rotor turbine engine includes a set of circumferentially spaced fan blades, which extend, exteriorly, beyond a nacelle encasing an engine core.

FIG. 1 is a schematic cross-sectional diagram of a turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The unducted turbine engine 10 as described herein is meant as a non-limiting example, and other architectures are possible, such as, but not limited to, the steam turbine engine, the supercritical carbon dioxide turbine engine, or any other suitable turbine engine.

An exterior surface, defined by a housing, such as a nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10, specifically, the fan section 18 extends radially outward from the nacelle 40. The fan section 18 includes a set of fan blades 42, and a set of stationary fan vanes 82 downstream the set of fan blades 42, both disposed radially about the engine centerline 12. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or the set of stationary fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

An HP shaft or spool 48 disposed coaxially about the engine centerline 12 of the unducted turbine engine 10 drivingly connects the HP turbine 34 to the HP compressor 26. An LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which collectively define a rotor 51.

It will be appreciated that the unducted turbine engine 10 is either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine are mounted to a disk 71, which is mounted to the corresponding one of the HP and LP spools 48, 50, with each stage having a dedicated disk 71. The static turbine vanes 72, 74 for a stage of the compressor are be mounted to the engine casing 46 in a circumferential arrangement.

Complementary to the rotor portion, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

During operation of the unducted turbine engine 10, a freestream airflow 79 flows against a forward portion of the unducted turbine engine 10. A portion of the freestream airflow 79 enters an annular area 25 defined by the swept area between the outer surface of the nacelle 40 and the tip of the blade, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The inlet airflow 78 flows through the set of fan blades 42 and over the nacelle 40 of the unducted turbine engine 10. Subsequently, the inlet airflow 78 flows over at least a portion of the set of stationary fan vanes 82, which directs the inlet airflow 78 such that it is transverse toward the engine centerline 12. The inlet airflow 78 then flows past the set of stationary fan vanes 82, following the curvature of the nacelle 40 and toward the exhaust section 38. A pylon 84 mounts the unducted turbine engine 10 to an exterior structure (e.g., a fuselage of an aircraft, a wing, a tail wing, etc.).

The working airflow 76 and at least some of the inlet airflow 78 merge downstream of the exhaust section 38 of the unducted turbine engine 10. The working airflow 76 and the inlet airflow 78, together, form an overall thrust of the unducted turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
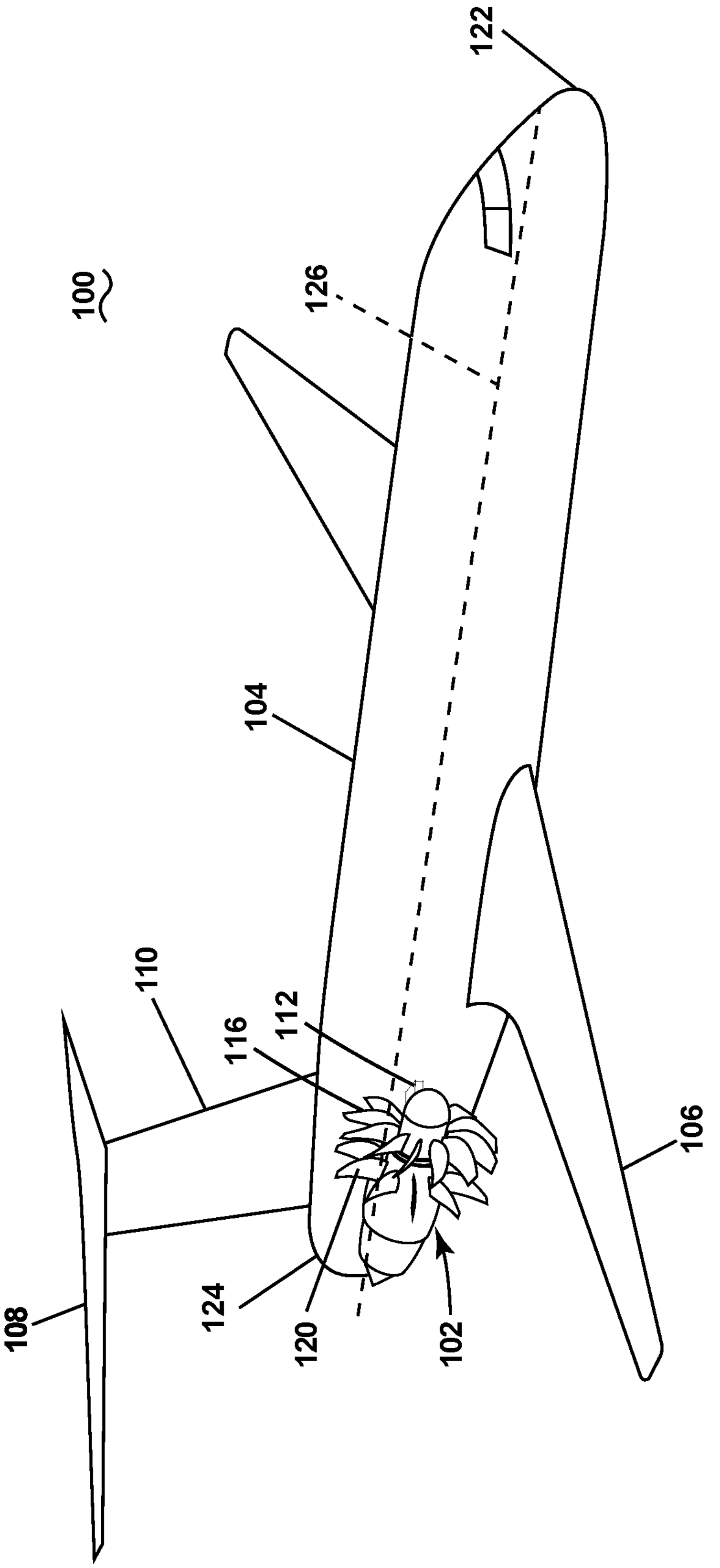
FIG. 2 is a schematic perspective view of an aircraft including the unducted or open rotor turbine engine of FIG. 1.

FIG. 2 is a schematic perspective view of an aircraft 100 including a generic unducted turbine engine 102 suitable for use as the unducted turbine engine 10 of FIG. 1. The aircraft 100 includes a fuselage 104 with an exterior surface. At least one wing 106 and a tail wing 108 extend from the fuselage. The tail wing 108 is operably coupled to and spaced from the fuselage 104 via a tail wing pylon 110. The unducted turbine engine 102 is operably coupled to the exterior surface of the fuselage 104 via a pylon 112. The unducted turbine engine 102 includes a set of circumferentially spaced fan blades 116. A set of stationary fan vanes 120 is provided downstream of the set of circumferentially spaced fan blades 116. The fuselage 104 extends between a nose 122 and a tail 124 and includes a fuselage centerline 126 extending therebetween.

Additionally, while the tail wing 108 is a T-wing tail wing (e.g., the tail wing 108 as illustrated), other conventional tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 108.

Figure 3:
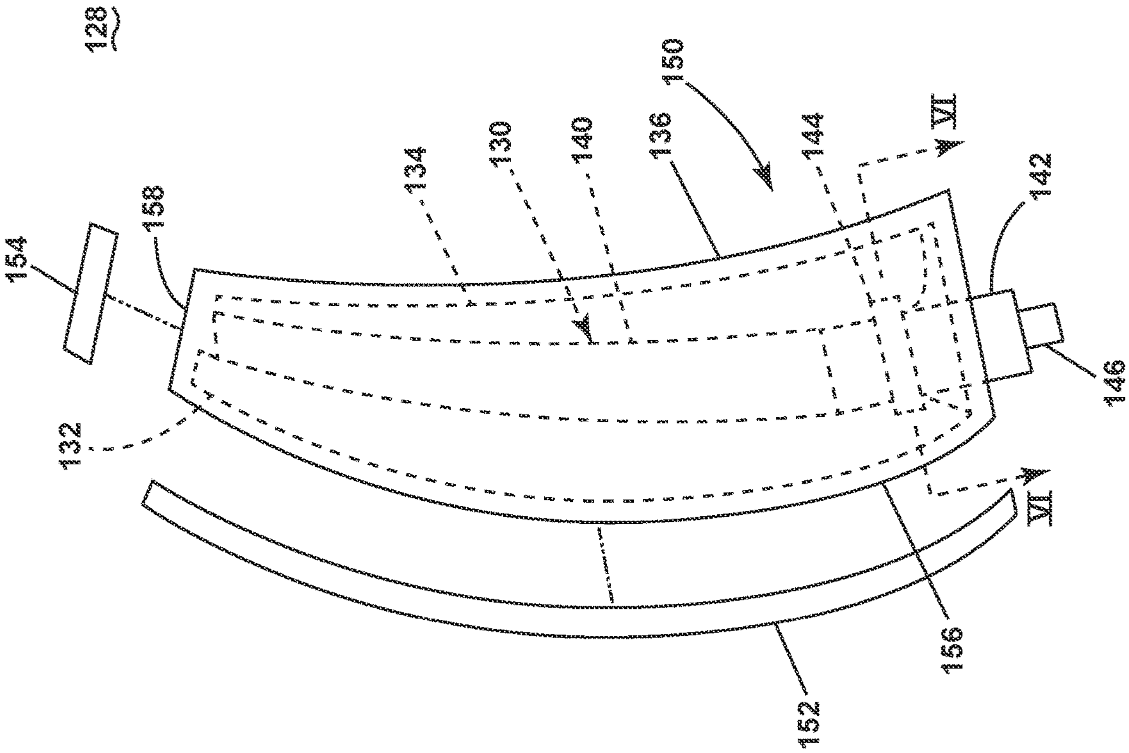
FIG. 3 is side view of an airfoil of the turbine engine of FIG. 1 in accordance with an exemplary embodiment of the present disclosure.

FIG. 3 is a side view of an airfoil 128 illustrated, by way of example, as a composite blade. The airfoil 128 can be, by way of non-limiting example, a blade of the set of fan blades 42, 116. By way of further non-limiting example, the airfoil 128 can be a vane of the set of stationary fan vanes 82, 120, a vane of the static vanes 60, 62, 72, 74, or a blade from the compressor blades 56, 58 or the turbine blades 68, 70. It is contemplated that the airfoil 128 can be a blade, vane, airfoil, or other component of any turbine engine, such as, but not limited to, a gas turbine engine, a turboprop engine, a turboshaft engine, or a turbofan engine.

The airfoil 128 includes a spar assembly 130. The airfoil 128 can also include a structural support or structural element coupled to a portion of the spar assembly 130, illustrated as a first structural element 132 and a second structural element 134, and a skin 136 circumscribing at least a portion of the first structural element 132 and the second structural element 134.

The spar assembly 130 can include a composite spar 140 coupled to a metallic root or spar illustrated as a metallic hub 142. The composite spar 140 can include polymeric material, thermoplastics, bismaleimides (BMI), polyimides, or other non-metal materials. The metallic hub 142 can include metals such as, but not limited to, titanium, iron, aluminum, stainless steel, or nickel.

Alternatively, it is further contemplated that in a differing and non-limiting example, the composite spar 140 can be a composite-metallic spar, where the composite spar 140 includes, for example, metal matrix composites (MMC) or carbon fiber infused with metal fibers.

A composite body illustrated by way of example as a composite wrap 144 can circumscribe a portion of the composite spar 140 and the metallic hub 142 that defines an overlapping region (described presently). The composite wrap 144 can be a material wrapped or turned around the composite spar 140 and the metallic hub 142. The number of turns of material to form the composite wrap 144 can be, for example 1-30 turns, although any number of turns is contemplated. More specifically the composite wrap 144 can be 2-8 turns of a composite material.

It is also contemplated that the material wrapped or turned around the composite spar 140 can be a variety of composite materials.

Alternatively, it is further contemplated that in a differing and non-limiting example, that the composite body can be composite components (not shown) coupled together or overlapping to circumscribe a portion of the composite spar 140 and the metallic hub 142 with composite material.

The metallic hub 142 can include one or more protrusions or fastening portions 146 that can be formed with or coupled to the metallic hub 142. The fastening portions 146 or the metallic hub 142 can couple the airfoil 128 to one or more portions of the unducted turbine engine 10 (FIG. 1).

The first structural element 132 and the second structural element 134 can couple to the composite spar 140 or the metallic hub 142. The first structural element 132 and the second structural element 134 can be foam or another composite material.

Optionally, one or more portions of the first structural element 132 or the second structural element 134 can be a sacrificial structure element removed during manufacturing of the airfoil 128. By way of example, one or more portions of the first structural element 132 or the second structural element 134 can be removed during curing of one or more adhesives or portions of the skin 136.

While illustrated as the first structural element 132 and the second structural element 134, any number of structural elements are contemplated.

The skin 136 can be one or more layers of material. The one or more layers of material can be applied during the same stage or different stages of the manufacturing of the airfoil 128. The skin 136 can circumscribe or surround at least a portion of the first structural element 132, the second structural element 134, at least a portion of the composite spar 140, and a portion of the metallic hub 142.

By way of non-limiting example, the skin 136 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, Kevlar fibers, bismaleimides (BMI), metal matrix composites (MMC), or polyimides.

The polymeric portion can overlay at least part of the PMC portion. The polymetric portion can include, by way of non-limiting example, polyurethane resin or surfacing films, such as an epoxy-based composite surfacing film.

An airfoil body 150 can be defined by the spar assembly 130, the first structural element 132, the second structural element 134, and the skin 136. Optionally, a leading edge cap 152 or a tip cap 154 can couple to the airfoil body 150 at a leading edge 156 or a tip 158, respectively, of the airfoil body 150. The PMC portion or the polymetric portion of the skin 136 can be located beneath or partially overlay regions of the leading edge cap 152 or the tip cap 154.

Optionally, one or more layers of adhesive (not shown) can be applied between the composite spar 140 and the first structural element 132 or the second structural element 134, or both the first structural element 132 and the second structural element 134. Additionally, or alternatively, one or more layers of adhesive (not shown) can be applied between the composite spar 140 and the metallic hub 142 or the composite wrap 144, or between the metallic hub 142 and the composite wrap 144.

It is also contemplated that one or more layers of adhesive (not shown) can be applied between the skin 136 and the spar assembly 130, the first structural element 132, the second structural element 134, or any combination therein. Further, it is contemplated that adhesive can be absorbed by the skin 136, one or more portions of the spar assembly 130, the first structural element 132, or the second structural element 134.

The optional adhesive can include epoxy, phenolics, resin, or other known adhesives, wherein the adhesive can require curing or other hardening technique.

Figure 4:
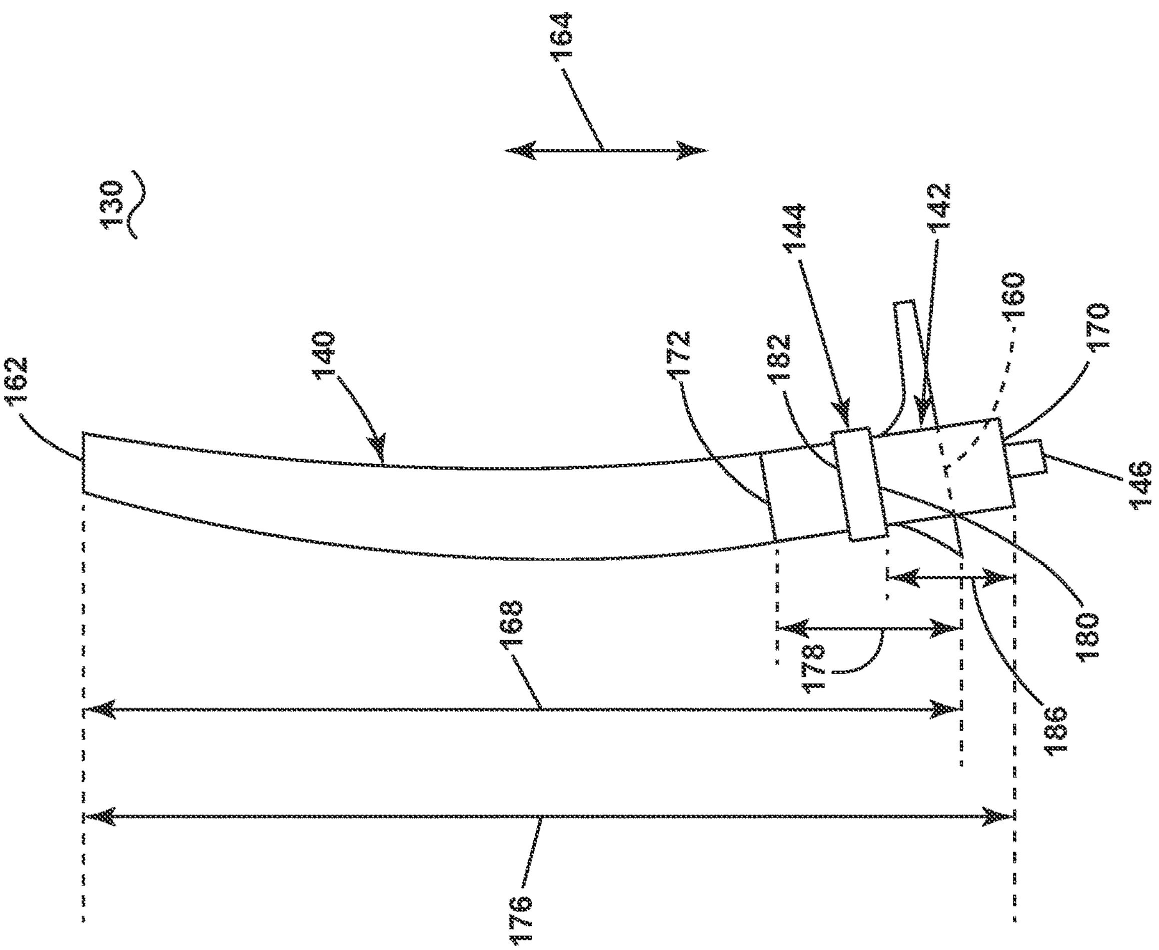
FIG. 4 is a spar assembly of the airfoil of FIG. 3 in accordance with an exemplary embodiment of the present disclosure.

FIG. 4 is a side view of the spar assembly 130 of the airfoil 128 (FIG. 3). The composite spar 140 extends from a spar base 160 to a spar tip 162, defining a longitudinal direction 164. A spar length 168 can be measured longitudinally from the spar base 160 to the spar tip 162.

The metallic hub 142 can include a first end 170 and a second end 172. While illustrated at the interface of the metallic hub 142 and the fastening portion 146, it is contemplated that the first end 170 can be located at a longitudinally extending portion or end of the fastening portion 146.

A spar assembly length 176 of the spar assembly 130 can be measured from the first end 170 of the metallic hub 142 to the spar tip 162 of the composite spar 140.

An overlapping region 178 is defined by the portions of the composite spar 140 and the metallic hub 142 that are in an overlapping configuration or overlapping relationship. The overlapping region 178 can be the region extending from the spar base 160 to the second end 172 of the metallic hub 142. The overlapping region 178 can include the portion of the composite spar 140 received in the metallic hub 142.

A structural joint between the composite spar 140 and the metallic hub 142 is defined by the composite wrap 144 located at the overlapping region 178. A first edge 180 and a second edge 182 of the composite wrap 144 can define the longitudinal boundaries of the composite wrap 144.

While illustrated as having a uniform thickness in the longitudinal direction 164 from the first edge 180 to the second edge 182, it is contemplated that the longitudinal thickness of the composite wrap 144 can change. It is also contemplated that any number of composite wraps can be used.

A wrap distance 186 can be measured from the first edge 180 of the composite wrap 144 to the first end 170 of the metallic hub 142. The wrap distance 186 can be between 0.5% and 40% of the spar assembly length 176. It is contemplated that the wrap distance 186 can be equal to or between 2%-30% of the spar assembly length 176.

The composite wrap 144 can include, for example, a laminate, a braid, or a woven material. The laminate, braid, or woven material can include, by way of example, carbon, polymeric material or matrix, ceramic material or matrix, fiberglass or glass fibers, or thermoplastics.

Figure 5:
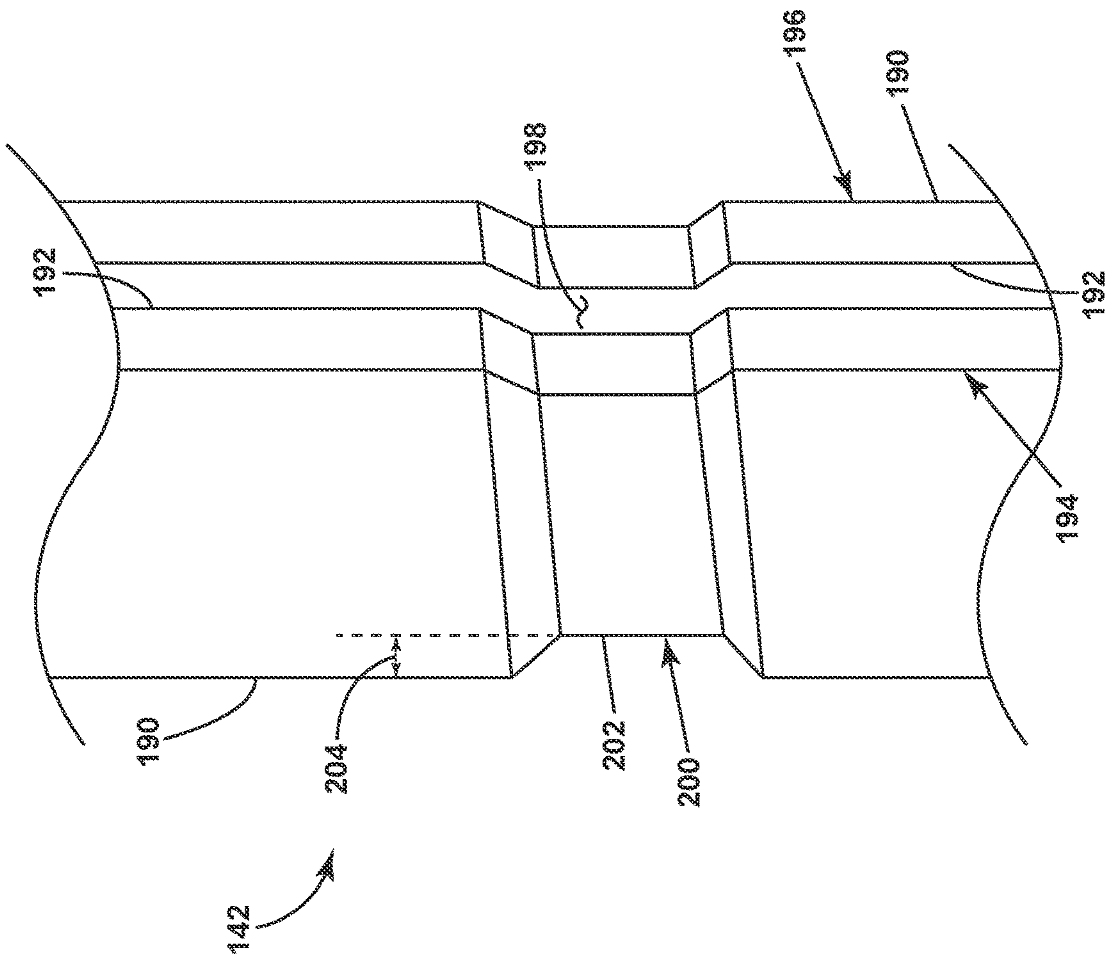
FIG. 5 is a schematic perspective view of a portion of a metallic hub of the spar assembly of FIG. 4 in accordance with an exemplary embodiment of the present disclosure.

FIG. 5 is a schematic perspective view of a portion of the metallic hub 142. The metallic hub 142 has an exterior surface 190 and an interior surface 192. The metallic hub 142 can have a fork defined by a first branch 194 separated by a second branch 196.

A gap 198 defined between the interior surfaces 192 of the first branch 194 and the second branch 196 can receive a portion of the composite spar 140 (FIG. 4).

It is contemplated, however, that the metallic hub 142 can be a hollow prism, having any shape, where at least a portion of the composite spar 140 is received within the metallic hub 142. That is, the interior surface 192 can, instead of a fork shape as illustrated, define the interior of a hollow prism.

A recessed portion 200 can be located in the metallic hub 142. The recessed portion 200 can include a recessed surface 202. The recessed surface 202 of the recessed portion 200 is defined in the exterior surface 190 of the metallic hub 142.

The composite wrap 144 (FIG. 4) can be received by the recessed portion 200. That is, the composite wrap 144 (FIG. 4) can contact the recessed surface 202. The recessed portion 200 is located in the overlapping region 178 (FIG. 4), where the recessed portion 200 can receive a portion of the composite wrap 144 (FIG. 4).

A recess depth 204 can be measured from the exterior surface 190 of the metallic hub 142 to the recessed surface 202 measured in the direction from the exterior surface 190 towards the interior surface 192.

Figure 6:
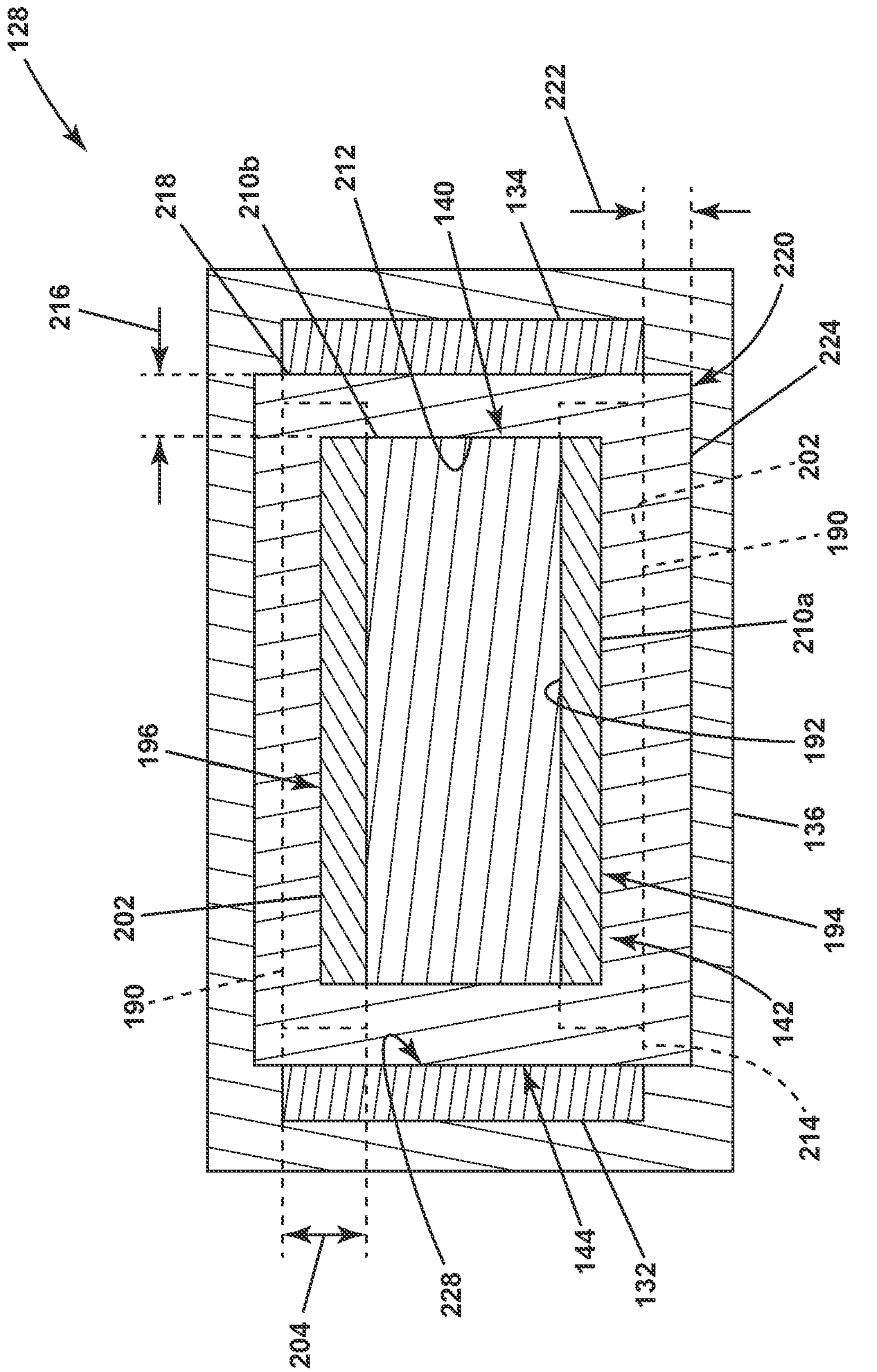
FIG. 6 is a schematic cross section taken at the line VI-VI of FIG. 3

FIG. 6 is a schematic cross section taken at the line VI-VI in FIG. 3 further illustrating the structural joint between the composite spar 140 and the metallic hub 142. By way of non-limiting example, the composite spar 140, the composite wrap 144, the first branch 194 and the second branch 196, the first structural element 132 and the second structural element 134, and the skin 136 are illustrated as having a generally rectangular or hollow rectangular cross section to ease description and explanation. While illustrated as having a rectangular cross section, any shape or combination of shapes are contemplated for the composite spar 140, the composite wrap 144, the first branch 194 and the second branch 196, the first structural element 132 and the second structural element 134, and the skin 136. For example, elements of the airfoil 128 can have a cross section or hollow cross section that is a circle, oval, ellipse, square, any regular or irregular polygon, or any combination therein. That is, the composite spar 140, the composite wrap 144, the first branch 194 and the second branch 196, the first structural element 132 and the second structural element 134, and the skin 136 can include a complex or compound shape with varying or uniform thicknesses. Further, aspects of the drawings are not scaled and elements may be exaggerated to ease description and explanation.

The composite spar 140 can include spar exterior surfaces 210*a*, 210*b*. At least a portion of the spar exterior surface 210*a* can be in contact with the interior surface 192 of the metallic hub 142. Another portion of the spar exterior surface 210*b* can be in contact with a wrap interior surface 212, as the composite wrap 144 circumscribes the metallic hub 142 and the composite spar 140 at the recessed surface 202. A wrap thickness 216 can be measured from the wrap interior surface 212 to an outermost extent or a wrap exterior surface 218. That is, the wrap thickness 216 can be measured from the recessed surface 202 to the outermost extent or outermost portion of the composite wrap 144.

It is contemplated that the wrap thickness 216 can be between 0.1%-40% of the length of the overlapping region 178 (FIG. 4). It is further contemplated that the wrap thickness 216 can be equal to or between 0.5%-30% of the length of the overlapping region 178.

Alternatively, it is further contemplated that in a differing and non-limiting example, that the wrap thickness 216 can be between 0.01 centimeter and 20 centimeters.

For metallic hubs 142 having the recessed portion 200 (FIG. 5), the wrap thickness 216 can be equal to or between 5%-300% of the recess depth 204 measured from the recessed surface 202 to the exterior surface 190 of the metallic hub 142. However, it is contemplated that the wrap thickness 216 can be 75%-200% of the recess depth 204.

When the composite wrap thickness 216 is between or equal to 5%-100% of the recess depth 204, the composite wrap 144 extends only between the recessed surface 202 and the exterior surface 190 of the metallic hub 142. When the composite wrap thickness 216 is greater than 100% and less than or equal to 200% of the recess depth 204, the composite wrap 144 extends beyond the exterior surface 190 of the metallic hub 142, as illustrated by example in FIG. 6.

The composite wrap 144 can be in contact with the skin 136 above or below the composite wrap 144 (illustrated as into or out of the page). That is, an inner surface 214 of the skin 136 can be in contact with the exterior surface 190 of the metallic hub 142. While not illustrated, adhesive can bond or be located between portions of any of the surfaces of FIG. 6 including, for example, between the inner surface 214 of the skin 136 and the exterior surface 190 of the metallic hub 142.

A skin recess 220 in the inner surface 214 of the skin 136 can receive a portion of the composite wrap 144 that extends beyond the exterior surface 190 of the metallic hub 142. The skin recess 220 can have a skin recess depth 222 measured from the exterior surface 190 of the metallic hub 142 to an interface 224 of the skin 136 and the composite wrap 144.

Similarly, a structural recess 228 in the first structural element 132 or the second structural element 134 can receive a portion of the composite wrap 144 that extends beyond the exterior surface 190 of the metallic hub 142. The structural recess 228 can have a depth that is greater than, equal to, or less than the skin recess depth 222.

Figure 7:
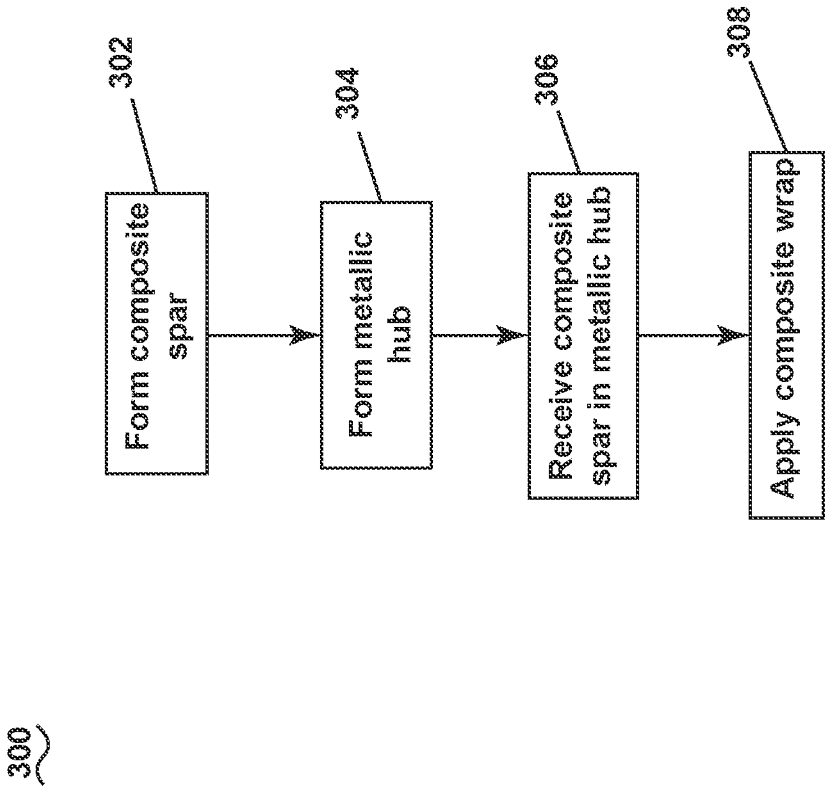
FIG. 7 is a flow chart illustrating a method of forming the spar assembly of FIG. 4 in accordance with an exemplary embodiment of the present disclosure.

FIG. 7 is a method 300 of forming the spar assembly 130 for the airfoil 128 of FIGS. 3-6. At 302, the composite spar 140 can be formed from one or more non-metallic materials. At 304, the metallic hub 142 can be formed using at least one metal material. Alternatively, the metallic hub 142 can be a composite hub formed from non-metallic material, where the composite hub has a bulk modulus that is greater than a bulk modulus of the composite spar 140. The metallic hub 142 includes the recessed portion 200.

At 306, the spar base 160 and a portion of the spar body are received at an interior surface 192 of the metallic hub 142, defining the overlapping region 178 of the spar base 160 and the interior surface 192. While illustrated in FIGS. 5 and 6 as having the first branch 194 and the second branch 196, it is contemplated that the metallic hub 142 can have a hollow cylinder shape. That is, the metallic hub 142 can circumscribe the composite spar 140 at the overlapping region 178. It is contemplated that the shape of the metallic hub 142 can be any shape having an interior surface capable of contacting and receiving at least a portion of the composite spar 140.

Optionally, one or more adhesives or mechanical fasteners can be added between the composite spar 140 and the metallic hub 142, to further retain the composite spar 140 and the metallic hub 142 at the overlapping region 178.

At 308, the composite wrap 144 is applied around at least a portion of the metallic hub 142 at the overlapping region 178 to define the spar assembly 130. The structural joint between the metallic hub 142 and the composite spar 140 is defined by the composite wrap 144. That is, the composite wrap 144 encircles, is wrapped around, encases, or otherwise circumscribes the metallic hub 142 at a location where the metal hub 142 receives or overlaps the composite spar 140.

The composite wrap 144 can be in contact with the recessed surface 202. Optionally, the composite wrap 144 can be in contact with the portion of the spar exterior surface 210*b*.

It is contemplated that the metallic hub 142 does not include the recessed portion 200. That is, by way of non-limiting example, the composite wrap 144 can be located at any portion of the overlapping region 178, where the composite wrap 144 can be in contact with the exterior surface 190 of the metallic hub 142 and optionally in contact with the portion of the spar exterior surface 210*b*, depending on the shape of the metallic hub 142 (fork or hollow prism).

It is further contemplated that one or more adhesives, fasteners, or stiffening materials can be added at the recessed portion 200 or to the composite wrap 144 to further secure the structural joint between the metallic hub 142 and the composite wrap 144.

Optionally, the composite wrap 144 or one or more adhesives within the composite wrap 144 or applied to the composite wrap 144 can be cured or co-cured. Additionally, or alternatively, the skin 136 or one or more adhesives within the skin 136 or applied to the skin 136 can be cured or co-cured with the composite wrap 144 or one or more adhesives located at or within the composite wrap 144.

Figure 8:
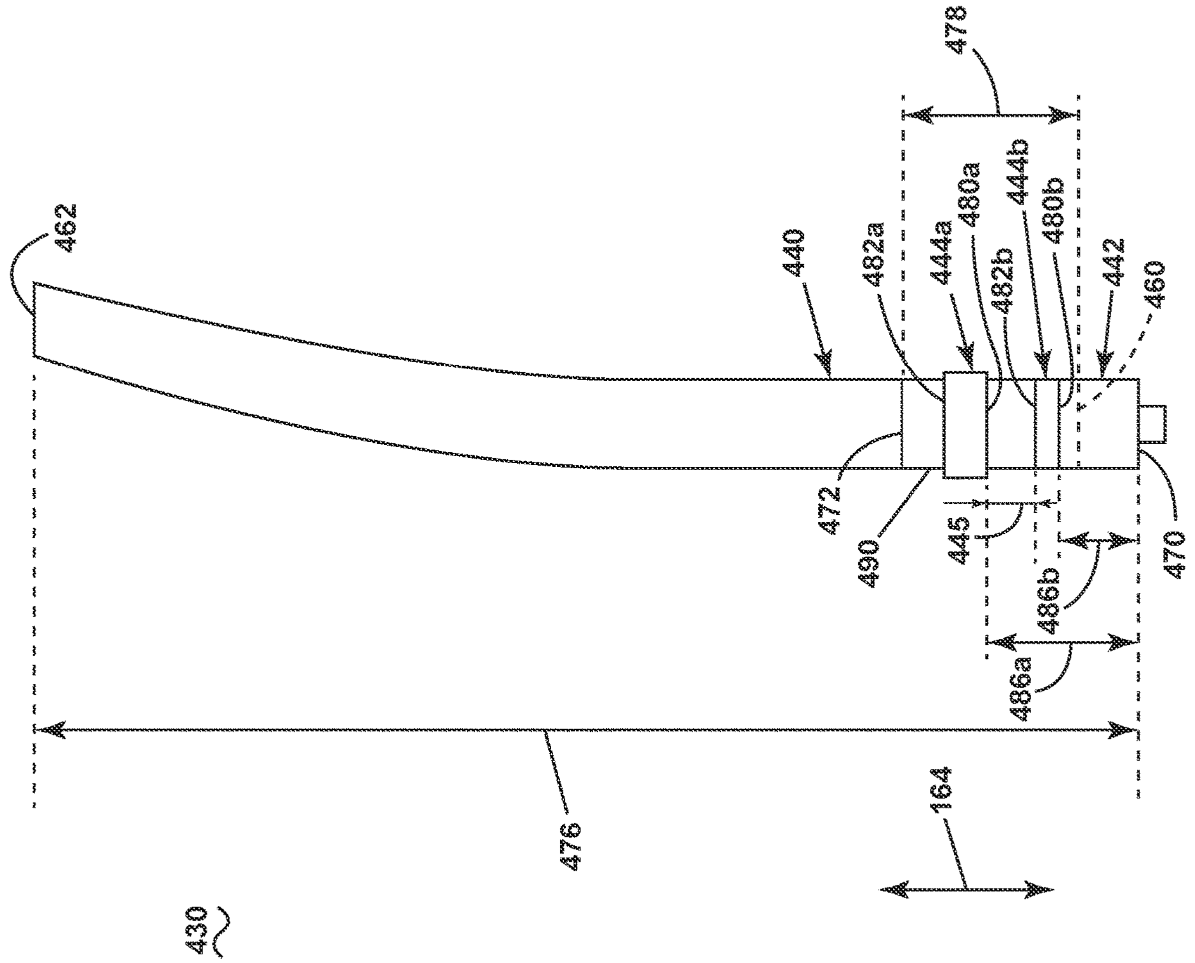
FIG. 8 is a variation of the spar assembly FIG. 4 in accordance with an exemplary embodiment of the present disclosure.

FIG. 8 illustrates a spar assembly 430, which is a variation of the spar assembly 130 of FIG. 4 that can be used in the airfoil 128 (FIG. 3). The spar assembly 430 can be similar to the spar assembly 130, therefore, like parts will be identified with like numerals increased by 300, with it being understood that the description of the spar assembly 130 applies to the spar assembly 430 unless otherwise noted.

The spar assembly 430 includes a metallic hub 442 that receives a composite spar 440 where a composite wrap is located at an overlapping region 478 of the metallic hub 442 and the composite spar 440. The overlapping region 478 is defined as the region extending from a spar base 460 to a second end 472 of the metallic hub 442.

The composite wrap is illustrated, by way of example, as a first wrap 444*a* and a second wrap 444*b*, although any number of wraps are contemplated.

The first wrap 444*a* and the second wrap 444*b* can have respective first edges 480*a*, 480*b* and second edges 482*a*, 482*b*. While illustrated as having a uniform thickness in the longitudinal direction 164 from the first edges 480*a*, 480*b* to the second edges 482*a*, 482*b*, it is contemplated that the longitudinal thickness of the first wrap 444*a* or the second wrap 444*b* can vary.

It is also contemplated that the first wrap 444*a* and the second wrap 444*b* can include different materials or different bulk modulus. The thickness or number of times the first wrap 444*a* and the second wrap 444*b* are wrapped around the metallic hub 442 can also vary. Any number of turns or layers of wrap are considered, where the layers of wrap can have varying thickness, width, or material. In other words, the first wrap 444*a* and the second wrap 444*b* can have different numbers of turns. By way of non-limiting example, the first wrap 444*a* can include 6 turns or layers, while the second wrap 44*b* can include 3 turns or layers. Each turn or layer can be the same material or made of different materials. In other words, the material used to create the first wrap 444*a* or the second wrap 444*b* can be continuous, for example, and wrapped or otherwise circumscribe the overlapping portion one or more times. Alternatively, in another different and non-limiting example, discontinuous pieces of material can be used to circumscribe the overlapping portion one or more times to form the turns or layers of the first wrap 444*a* or the second wrap 444*b*.

The first wrap 444*a* is longitudinally spaced from the second wrap 444*b*. A distance 445 can be measured, for example, from the second edge 482*b* of the second wrap 444*b* to the first edge 480*a* of the first wrap 444*a*. The distance 445 between the first wrap 444*a* and the second wrap 444*b* can be greater than 1% and less than 100% of the overlapping region 478.

A spar assembly length 476 can be measured from a first end 470 of the metallic hub 442 to a tip 462 of the composite spar 440. The distance 445 between the first wrap 444*a* and the second wrap 444*b* can be between 0.01% and 40% of the spar assembly length 476. More specifically, the distance 445 between the first wrap 444*a* and the second wrap 444*b* can be between 2% and 20% of the spar assembly length 476.

Alternatively, it is contemplated that in a differing and non-limiting example, at least a portion of the first wrap 444*a* and the second wrap 444*b* overlap.

A first wrap distance 486*a* can be measured from the first edge 480*a* of the first wrap 444*a* to the first end 470 of the metallic hub 442. In another and different non-limiting example, the first wrap distance 486*a* can be measured from the first edge 480*a* of the first wrap 444*a* to the spar base 460. The first wrap distance 486*a* can be between 0.5% and 40% of the spar assembly length 476.

A second wrap distance 486*b* can be measured from the first edge 480*b* of the second wrap 444*b* to the first end 470 of the metallic hub 442. In another and different non-limiting example, the second wrap distance 486*b* can be measured from the first edge 480*b* of the second wrap 444*b* to the spar base 460. The second wrap distance 486*b* can be between 0.5% and 40% of the spar assembly length 476. The second wrap distance 486*b* is illustrated, by way of example, as less than the first wrap distance 486*a*. However, it is contemplated that the second wrap distance 486*b* can be greater than the first wrap distance 486*a*.

The first wrap 444*a* is illustrated, by way of example, as extending beyond an exterior surface 490 of the metallic hub 442. The metallic hub 442 can include a recess (generally similar to recessed portion 200 of FIG. 5) that receives, at least in part, a portion of the first wrap 444*a*, alternatively, the first wrap 444*a* can be applied or wrapped on the exterior surface 490 of the metallic hub 442. It is also contemplated that a portion of the first wrap 444*a* is received by a recessed portion that extends into the metallic hub 442, but is wrapped in such a way that the first wrap 444*a* is also in contact with the exterior surface 490.

The second wrap 444*b* is illustrated, by way of example, as flush or otherwise even with the exterior surface 490 of the metallic hub 442. The metallic hub 442 can include a recess (generally similar to recessed portion 200 of FIG. 5) that receives the second wrap 444*b*.

Benefits associated with the spar assembly as described herein include an increased bond strength between the composite spar and the metal trunnion or metallic hub under chordwise loading conditions due to the one or more composite wraps.

Additional benefits include a redundant load path, where a load is received by more than just an adhesive bond. This additional load path essentially takes a shear load between the composite spar and the trunnion or metal hub and converts it to a circumferential load in the fibers of the composite wrap or composite body.

Yet another benefit is the improved bonding between composite material and metallic material, as the composite wrap secures the composite spar to the metallic hub. The improved bonding can secure the composite material and metallic material in the absence or wear of adhesive. The improved bonding can also secure the composite material and metallic material during an ingestion event or other high loading event.

Further aspects of the disclosure are provided by the subject matter of the following clauses:

An airfoil for a turbine engine, the airfoil having a spar assembly that includes a composite spar extending from a spar base to a tip, defining a longitudinal direction, a metallic hub having a first end and a second end, wherein a portion of the composite spar is received by a portion of the metallic hub defining an overlapping region between the spar base and the second end, and a composite body circumscribing a portion of the overlapping region defining a structural joint between the composite spar and the metallic hub.

The airfoil of any preceding clause, further comprising a structural support coupled to the composite spar and a skin circumscribing at least a portion of the structural support, a portion of the composite spar, and a portion of the metallic hub.

The airfoil of any preceding clause, further comprising a recessed portion in the metallic hub, the recessed portion located at the overlapping region, wherein the composite body is received, at least in part, by the recessed portion.

The airfoil of any preceding clause, wherein the skin includes a skin recess, wherein a portion of the composite body is received by the skin recess.

The airfoil of any preceding clause, further comprising a spar assembly length measured in the longitudinal direction from the first end of the metallic hub to the tip of the composite spar, wherein a first edge of the composite body is located at a wrap distance from the first end of the metallic hub, and wherein the wrap distance is 0.5%-40% of a spar assembly length.

The airfoil of any preceding clause, wherein the composite body includes a wrap thickness measured from an exterior surface of the metallic hub to an outermost portion of the wrap, wherein the wrap thickness is between 0.1%-40% of a length of the overlapping region.

The airfoil of any preceding clause, wherein the composite body includes a first wrap and a second wrap located at the overlapping region, wherein the first wrap is longitudinally spaced from the second wrap.

The airfoil of any preceding clause, wherein the metallic hub includes a fork defined by a first branch and a second branch.

A spar assembly for a composite blade comprising a composite spar extending from a spar base to a tip, defining a longitudinal direction, a metallic hub having a first end and a second end, wherein a portion of the composite spar is received by a portion of the metallic hub defining an overlapping region between the spar base and the second end, and a composite body located at the overlapping region defining a structural joint between the composite spar and the metallic hub.

The spar assembly of any preceding clause, further comprising a recessed portion in the metallic hub located at the overlapping region.

The spar assembly of any preceding clause, wherein the composite body received by the recessed portion.

The spar assembly of any preceding clause, wherein the composite body received by the recessed portion includes a laminate, a braid, or a woven material.

The spar assembly of any preceding clause, wherein the composite body includes a wrap thickness measured from the exterior surface of the metallic hub to an outermost portion of the composite body, wherein the wrap thickness is between 0.1%-40% of a length of the overlapping region.

The spar assembly of any preceding clause, wherein the composite spar includes polymeric material and metallic material.

The spar assembly of any preceding clause, wherein the composite body includes a first wrap and a second wrap located at the overlapping region, wherein the first wrap is longitudinally spaced from the second wrap.

The spar assembly of any preceding clause, further comprising adhesive within the composite body or applied to the composite body, wherein the composite body or the adhesive can be cured.

The spar assembly of any preceding clause, wherein a first edge of the composite body is located at a wrap distance from the first end of the metallic hub, wherein the wrap distance is 0.5%-40% of a spar assembly length.

The spar assembly of any preceding clause, wherein the interior surface of the metallic hub has a fork shape or defines the interior of a hollow prism.

The spar assembly of any preceding clause, wherein a wrap thickness measured from a recessed surface to an outermost extent of the composite body, wherein the wrap thickness is 5%-300% of a recess depth measured from the recessed surface to an exterior surface of the metallic hub.

The spar assembly of any preceding clause, wherein at least a portion of a wrap exterior surface is flush with a portion of the exterior surface of the metallic hub.

The spar assembly of any preceding clause, wherein the wrap thickness is greater than or equal to 5% and less than 100% of a recess depth measured from the recessed surface to an exterior surface of the metallic hub.

The spar assembly of any preceding clause, wherein the wrap thickness is greater than 100% and less than or equal to 300% of a recess depth measured from the recessed surface to an exterior surface of the metallic hub.

We claim:

1. An airfoil for a turbine engine, the airfoil comprising:
a spar assembly comprising:
a composite spar extending from a spar base to a tip, defining a longitudinal direction;

a metallic hub having a first end and a second end, wherein a portion of the composite spar is received by a portion of the metallic hub defining an overlapping region between the spar base and the second end, wherein, at the overlapping region, at least a portion of a spar exterior surface is in contact with an interior surface of the metallic hub; and a composite body circumscribing a portion of the overlapping region and in contact with an exterior surface of the metallic hub and at least a portion of the spar exterior surface, wherein the composite body defines ng a structural joint between the composite spar and the metallic hub.

2. The airfoil of claim 1, further comprising a structural support coupled to the composite spar and a skin circumscribing at least a portion of the structural support, a portion of the composite spar, and a portion of the metallic hub.

3. The airfoil of claim 2, further comprising a recessed portion in the metallic hub, the recessed portion located at the overlapping region, wherein the composite body is received, at least in part, by the recessed portion.

4. The airfoil of claim 3, wherein the skin includes a skin recess, wherein a portion of the composite body is received by the skin recess.

5. The airfoil of claim 2, wherein the skin includes a skin recess, wherein a portion of the composite body is received by the skin recess.

6. The airfoil of claim 1, further comprising a spar assembly length measured in the longitudinal direction from the first end of the metallic hub to the tip of the composite spar, wherein a first edge of the composite body is located at a wrap distance from the first end of the metallic hub, and wherein the wrap distance is 0.5%-40% of the spar assembly length.

7. The airfoil of claim 1, wherein the composite body includes a wrap thickness measured from the exterior surface of the metallic hub to an outermost portion of the composite body, wherein the wrap thickness is between 0.1%-40% of a length of the overlapping region.

8. The airfoil of claim 1, wherein the composite body includes a first wrap and a second wrap located at the overlapping region, wherein the first wrap is longitudinally spaced from the second wrap.

9. The airfoil of claim 1, wherein the metallic hub includes a fork defined by a first branch and a second branch.

10. A spar assembly for a composite blade comprising:

a composite spar extending from a spar base to a tip, defining a longitudinal direction;

a metallic hub having a first end and a second end, wherein a portion of the composite spar is received by a portion of the metallic hub defining an overlapping region between the spar base and the second end, wherein, at the overlapping region, at least a portion of a spar exterior surface is in contact with an interior surface of the metallic hub; and a composite body located at the overlapping region and in contact with an exterior surface of the metallic hub and at least a portion of the spar exterior surface, wherein the composite body defines a structural joint between the composite spar and the metallic hub.

11. The spar assembly of claim 10, further comprising a recessed portion in the metallic hub located at the overlapping region.

12. The spar assembly of claim 11, wherein the composite body is received by the recessed portion.

13. The spar assembly of claim 12, wherein the composite body received by the recessed portion includes a laminate, a braid, or a woven material.

14. The spar assembly of claim 10, wherein the composite body includes a wrap thickness measured from the exterior surface of the metallic hub to an outermost portion of the composite body, wherein the wrap thickness is between 0.1%-40% of a length of the overlapping region.

15. The spar assembly of claim 10, wherein the spar assembly includes polymeric material and metallic material.

16. The spar assembly of claim 10, wherein the composite body includes a first wrap and a second wrap located at the overlapping region, wherein the first wrap is longitudinally spaced from the second wrap.

17. The spar assembly of claim 10, further comprising adhesive within the composite body or applied to the composite body, wherein the composite body or the adhesive can be cured.

18. The spar assembly of claim 10, wherein a first edge of the composite body is located at a wrap distance from the first end of the metallic hub, wherein the wrap distance is 0.5%-40% of a spar assembly length.

19. The spar assembly of claim 10, wherein the interior surface of the metallic hub has a fork shape or defines an interior of a hollow prism.

20. The spar assembly of claim 10, wherein a wrap thickness is measured from a recessed surface of the metallic hub to an outermost extent of the composite body, wherein the wrap thickness is 5%-300% of a recess depth measured from the recessed surface to the exterior surface of the metallic hub.

* * * * *